United States Patent [19]
Neumann et al.

[11] Patent Number: 6,089,618
[45] Date of Patent: Jul. 18, 2000

[54] SEALING DEVICE FOR PIPES

[75] Inventors: Wieland Neumann, Mönchengladbach, Germany; Lennart Jörnhagen, Värnamo, Sweden

[73] Assignee: Forsheda AB, Forsheda, Sweden

[21] Appl. No.: 09/046,350

[22] Filed: Mar. 23, 1998

[30] Foreign Application Priority Data

Apr. 16, 1997 [SE] Sweden ................................ 9701434

[51] Int. Cl.$^7$ .................................................. F16L 47/00
[52] U.S. Cl. ...................... 285/293.1; 285/230; 277/624; 277/627; 277/603
[58] Field of Search ................................ 285/293.1, 230, 285/231, 379, 374; 277/603, 604, 609, 611, 619, 624, 627

[56] References Cited

U.S. PATENT DOCUMENTS

| | | | |
|---|---|---|---|
| 2,230,725 | 2/1941 | Nathan | 277/624 |
| 2,615,741 | 10/1952 | Nathan | 277/604 X |
| 3,135,519 | 6/1964 | Ligon et al. | 285/293.1 X |
| 3,150,876 | 9/1964 | Lafferty | 277/603 |
| 3,858,912 | 1/1975 | Bower | 285/293.1 X |
| 4,186,931 | 2/1980 | Anderson | 285/293.1 X |
| 4,288,104 | 9/1981 | Nordin | 285/45 |
| 4,674,756 | 6/1987 | Fallon et al. | 277/624 |

FOREIGN PATENT DOCUMENTS

WO 94/07073 of 1993 WIPO.

*Primary Examiner*—Terry Lee Melius
*Assistant Examiner*—David E. Bochna
*Attorney, Agent, or Firm*—Baker & Daniels

[57] ABSTRACT

A sealing device for sealing an annular space between a socket and a spigot end introduced therein comprises a sealing ring (10) and an annular element (12) connected therewith and consisting of a non-elastic cellular plastic, for example styrene cellular plastic. The sealing device is intended to be moulded into the socket at the cylindrical inner surface thereof with the sealing ring (10) positioned adjacent the free end of the socket and the annular cellular plastic element (12) positioned axially inside the sealing ring. The annular element (12) consisting of non-elastic cellular plastic is formed with recesses (22) which are positioned at or in connection with the inner surface of the annular element for allowing a radial expansion of the inner surface of the annular element under the influence of the spigot end introduced into the socket.

21 Claims, 4 Drawing Sheets

SEALING DEVICE FOR PIPES

The present invention relates to a sealing device for sealing an annular space between two pipes, one of the pipes consisting of hardenable material, preferably concrete, and forming a socket provided with a substantially cylindrical inner surface and the other pipe forming a spigot end which is introducable into the socket and is formed with a substantially cylindrical outer surface.

The sealing device according to the invention is of the kind which includes a sealing ring consisting of an elastic material, preferably rubber, which sealing ring is in connection with the moulding of the pipe which is provided with the socket moulded into the socket at the cylindrical inner surface thereof. In order to take up the deformation of the sealing portion of the sealing ring, which is necessary for the sealing action and for receiving the spigot end axially inside the sealing ring when the spigot end is axially introduced into the socket provided with the sealing ring, it is necessary that the socket has axially inside the sealing ring an annular space of greater inner diameter than the inner diameter of the sealing ring before the sealing ring is influenced by the spigot end. According to the technique described in the Swedish Patent Specification No. 7809451-3 this space is formed by means of an annular element connected with the sealing ring and consisting of a non-elastic cellular plastic, for example styrene cellular plastic. The cellular plastic element is together with the sealing ring positioned on a substantially cylindrical mould portion, preferably a so called base ring, in a mould for moulding the pipe provided with the socket while the cellular plastic element and the sealing ring are at the same time moulded into the socket at the cylindrical inner surface thereof with the sealing ring positioned adjacent the free end of the socket and the annular cellular plastic element positioned axially inside the sealing ring. Thus, the cellular plastic element forms an annular space in the material of the pipe inside the sealing portion of the sealing element, and this space is according to the prior art technique uncovered prior to the pipe jointing by removing the cellular plastic element from the socket. Preferably, the cellular plastic element is left in the socket up to the time when the pipe jointing shall take place, as the cellular plastic element forms during transportation and storage of the pipe a protective element preventing dirt and water from entering said space prior to the pipe jointing. When the cellular plastic element has been removed, said annular space is established for receiving the deformation of the sealing portion of the sealing ring and for receiving the spigot end introduced into the socket. Said space allows also a certain angular positioning of the pipe end portion provided with a socket in the pipe end portion provided with the spigot end. A drawback of sealing devices of the kind in which the cellular plastic element is removed prior to the pipe jointing is the problem of taking care of the cellular plastic elements. Thus, these elements are often left at the place where the pipe jointing takes place. It is also difficult to take care of the cellular plastic elements in a correct way as the elements often blow away and are then difficult to collect.

In order to provide a solution to the problem of taking care of the cellular plastic elements the sealing device consisting of a sealing ring and an annular mould element has lately been developed, so that also the annular element positioned inside the sealing ring has been manufactured from an elastic material and has thereby often been provided with some kind of inner recesses. Thereby the annular element has been deformable in such a way that it has not been necessary to remove the annular element from the socket prior to the pipe jointing. Thus, the annular element has by being manufactured from an elastic material been provided with the capacity of taking up deformations of the sealing portion of the sealing ring and give way to the spigot end when this is introduced into the socket. A drawback of sealing devices in which the sealing ring as well as the annular element connected therewith consist of an elastic material is that the sealing device is while it is moulded into the socket fixed in a less correct way on the cylindrical mould surface than in the case that the annular element consists of a non-elastic material. This often provides for an incorrect moulded-in position of the sealing device in the socket which means that the sealing device will not act in a correct way at the pipe jointing.

Another drawback of a sealing device in which the sealing ring as well as the annular mould element consist of elastic material is that the costs for such a sealing device are higher than the costs for a sealing device in which the annular mould element consists of a non-elastic cellular plastic, for example styrene cellular plastic, as in the sealing device according to the prior art technique.

The object of the present invention is to provide a sealing device of the kind mentioned above by means of which the drawbacks of the prior art sealing devices of said kind are obviated.

In order to comply with this object there is according to the invention provided a sealing device comprising a sealing ring consisting of elastic material, preferably rubber, having a sealing portion for sealing the annular space as well as an annular element connected with the sealing ring and consisting of a non-elastic cellular plastic, for example styrene cellular plastic, which sealing device is characterized in that the annular element consisting of a non-elastic cellular plastic is formed with recesses positioned at or in connection with the inner surface of the annular element so as to allow a radial expansion of the inner surface of the annular element under the influence of the spigot end introduced into the socket and/or under the influence of deformation of the sealing portion of the sealing ring.

In a preferred embodiment of the invention the recesses are formed as grooves with intermediate bead-shaped projections forming the inner surface of the annular element. Thereby, the grooves and the bead-shaped projections can extend in the axial direction of the socket or extend obliquely to the axial direction of the socket so as to facilitate the destruction of the bead-shaped projections required for providing the radial expansion of the inner surface of the annular element. It is suitable to form the grooves so that they have in cross-section a rounded shape at their bottoms and have a rounded shape also at their end portions. This reduces the risk for collection of dirt in the grooves during storage and transportation of the pipes and provides for a more easy cleaning of the grooves prior to the pipe jointing.

It is possible also to arrange the grooves and the bead-shaped projections so that they extend peripherally around the socket which further facilitates the destruction of the bead-shaped projections required for allowing the radial expansion of the inner surface of the annular element. In order to prevent collection of dirt, water and ice in the grooves it is in this case suitable to close the recesses towards the inner surface of the annular element. This can be provided for example by closing the recesses by means of a foil covering or by means of thin walls of the same material as the annular element consisting of non-elastic cellular plastic.

By means of the invention there has been provided a sealing device of said kind which is favourable with regard to its costs, the sealing device being in a well defined way retained on the cylindrical surface in the mould when the concrete pipe is moulded and the sealing device is moulded into the socket of the pipe, while the pipe jointing is at the same time facilitated by the fact that the annular element can be left in the socket and thereby does not constitute any problem with regard to the environments.

The invention shall be described in the following with reference to the accompanying drawings.

Figure 1:
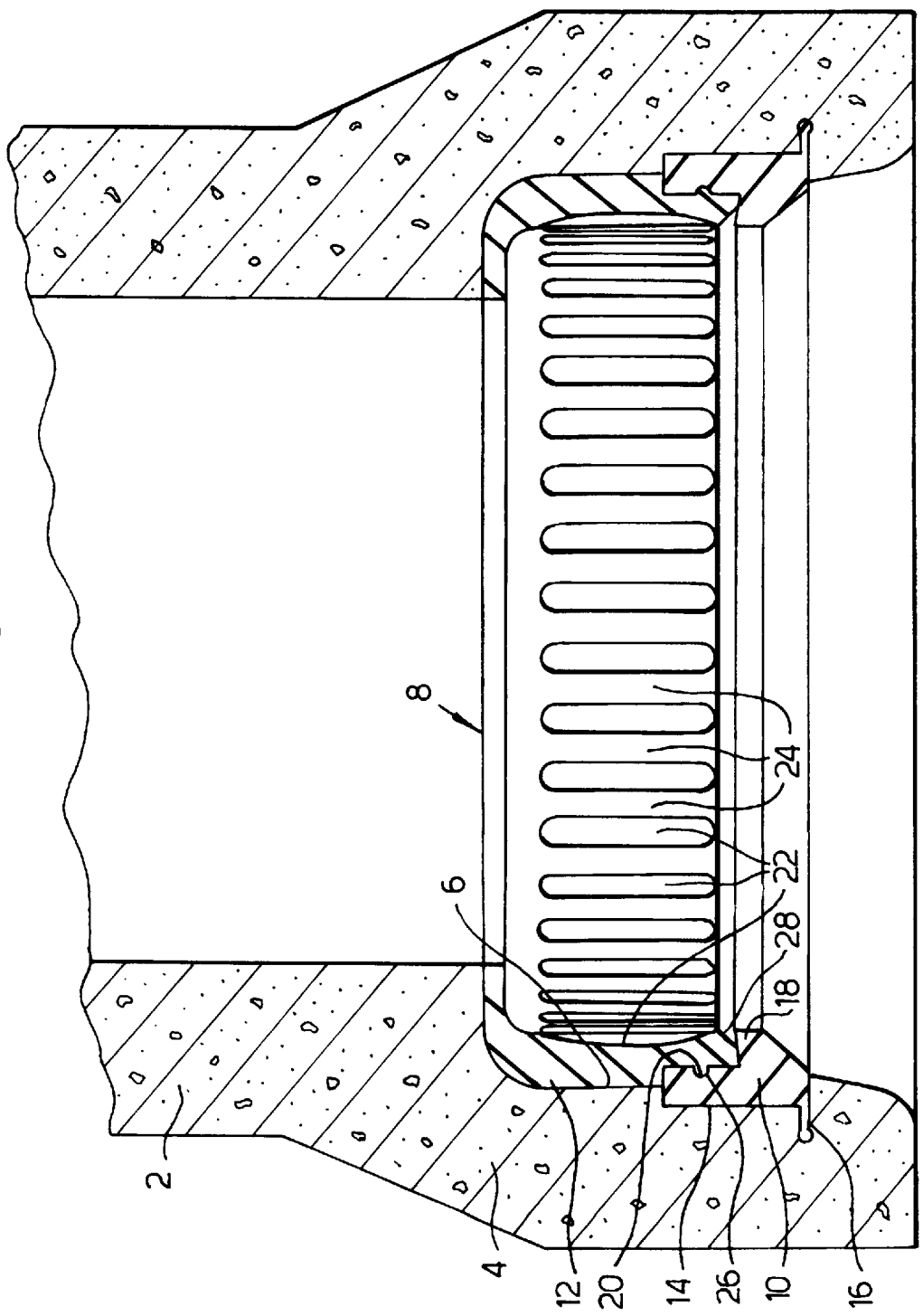
FIG. 1 is an axial section of a pipe end portion of a concrete pipe provided with a socket, a sealing device according to the invention being arranged in the socket.

In FIG. 1 there is shown an end portion of a pipe 2 consisting of concrete and formed with a socket 4. The socket 4 has a substantially cylindrical inner surface 6 into which a sealing device 8 according to the invention has been moulded. The sealing device 8 consists of a sealing ring 10 of rubber or rubber-elastic material and an annular element 12 which is positioned axially inside the sealing ring, is connected with the sealing ring and consists of non-elastic cellular plastic, for example styrene cellular plastic. The sealing ring 10 has a fastening portion 14 partly moulded into the concrete material of the pipe and having a retainer portion 16 and a projecting sealing portion 18. The fastening portion 14 has a groove 20 at its inner surface for improving and facilitating the connection of the sealing ring with the annular cellular plastic element 12.

The cellular plastic element 12 consists of non-elastic cellular plastic, preferably such a styrene cellular plastic which is manufactured by forming expanded granules in closed moulds in which the material is by means of vapor treatment sintered together to a continuous cellular mass. Such an annular cellular plastic element is stable with regard to its shape and has good tolerances. The cellular plastic element 12 is at its inner surface formed with circumferentially arrayed, axially extending grooves having intermediate bead-shaped projections 24 which form at its inner surfaces the inner surface of the annular cellular plastic element 12. The design of the grooves 22 and the bead-shaped projections 24 will be more exhaustively described with reference to FIGS. 3 and 4. At its surface facing the fastening portion 14 of the sealing ring 10 the cellular plastic element 12 has a peripherally extending, bead-shaped projection 26 which engages the groove 20 of the fastening portion 14 so as to improve the retaining of the sealing ring 10 and the cellular plastic element 12 in relation to each other. The cellular plastic element 12 has at its inner edge positioned in connection with the sealing portion 18 of the sealing ring 10 a chamfer which in the embodiment shown is formed as a conical surface 28.

Soiling and formation of ice during transportation and storage of the pipe provided with the sealing device according to the invention are prevented by the fact that the cellular plastic element 12 fills up the space positioned axially inside the sealing ring 10.

Because of the special design of the cellular plastic element 12 the cellular plastic element 12 can be retained in the socket also when the pipe 2 is connected with another pipe by axially introducing a spigot end into the socket to a sealing engagement with the sealing portion 18 of the sealing ring 10. The spigot end has an outer diameter which somewhat exceeds the inner diameter of the sealing portion 18 of the sealing ring 10 so that the outer surface of the spigot end will subject the sealing portion 18 to such a compression which is necessary for providing the sealing function of the sealing portion 18. This provides that the sealing portion 18 is at the introduction of the spigot end into the socket deformed into the space formed by the chamfer constituted by the conical surface 28 at the same time as the spigot end will break down the bead-shaped projections 24 which are thereby partly received in the grooves 22 positioned between the bead-shaped projections 24 which provides for an increased inner diameter of the cellular plastic element 12. The grooves 22 in the cellular plastic element 12 also provide that the material of the bead-shaped elements 24 is received in the grooves in such a way that the spigot end can be arranged at a certain angle in relation to the socket so that the pipes provided with the spigot end and the socket, respectively, can be arranged at an angle in relation to each other.

Figure 2:
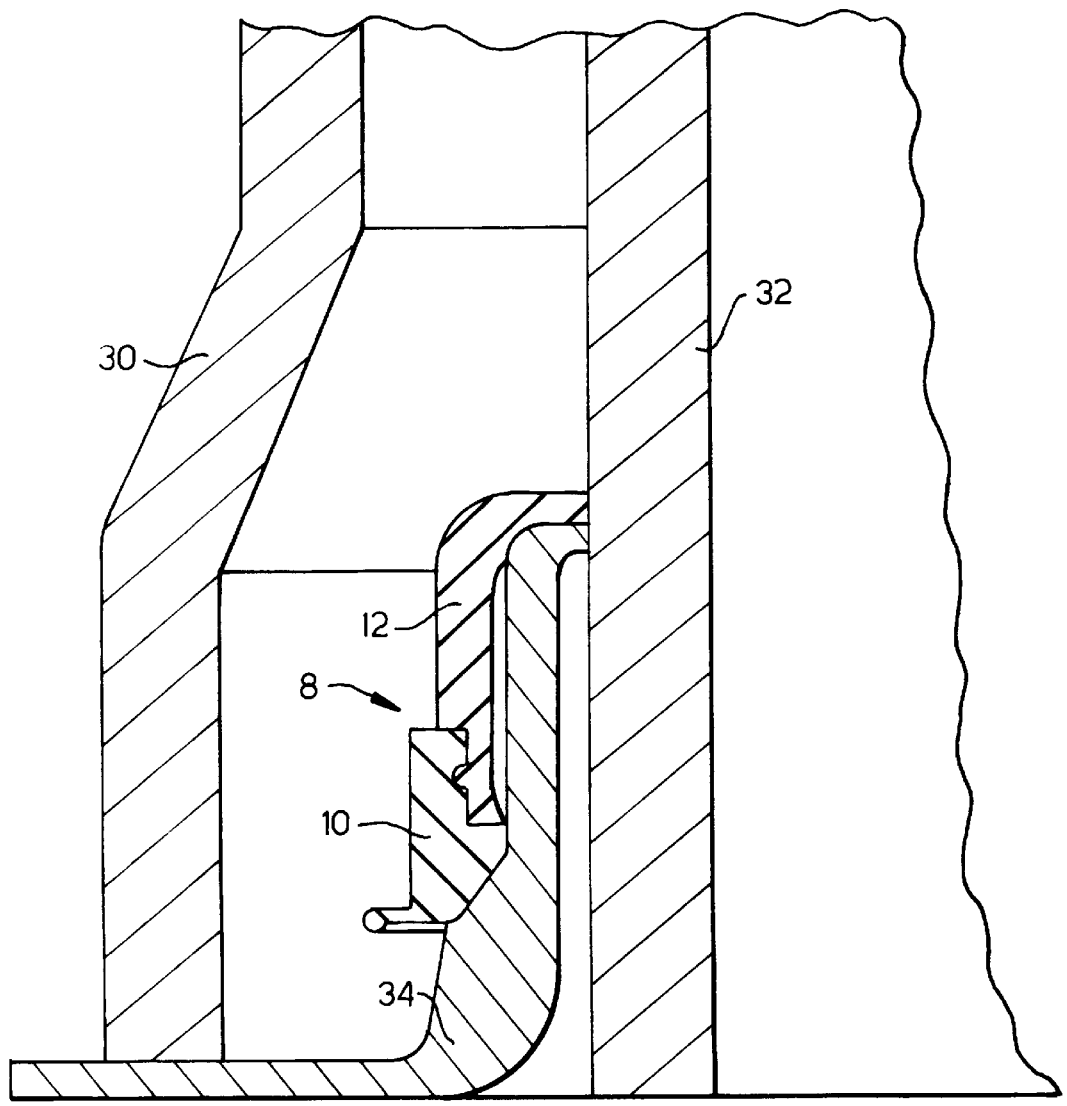
FIG. 2 is an axial section of a part of a mould for moulding the concrete pipe according to FIG. 1 with the sealing device according to the invention positioned on a bottom ring in the mould.

FIG. 2 illustrates the manufacturing of the concrete pipe 2 shown in FIG. 1 including its socket and sealing device 8. The concrete pipe is moulded by means of a mould which in a conventional way consists of two concentric mould portions 30 and 32 for providing the outer and inner surface, respectively, of the pipe wall and a bottom ring 34 forming a cylindrical mould portion for forming the inner surface of the socket 4 of the pipe and the end surface thereof. Before concrete is moulded into the mould the sealing device according to the invention consisting of the sealing ring 10 and the cellular plastic element 12 is positioned on the bottom ring 34. When concrete is moulded into the mould the fastening portion 14 of the sealing ring 10 is moulded into the concrete at the same as the inner and upper surfaces of the cellular plastic element 12 will form the inner surface of the socket 4 of the pipe 2. When the concrete has hardened the concrete pipe is removed from the mould portions 30, 32 and 34 while the sealing device consisting of the sealing ring 10 and the cellular plastic element 12 is left in the socket 4 of the pipe 2. Thus, there has in this way been provided a pipe of the kind shown in FIG. 1 having a socket 4 provided with a sealing device 8 according to the invention.

Figure 3:
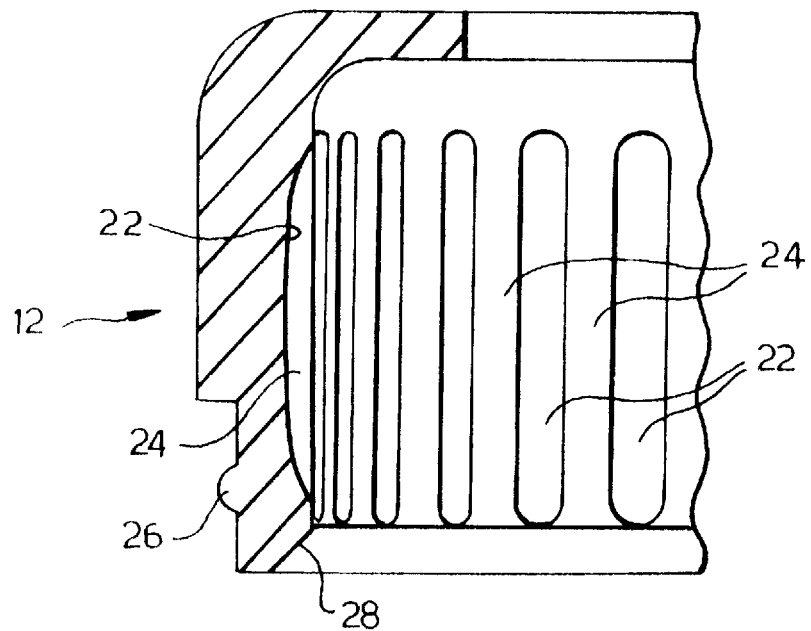
FIG. 3 is an axial section of a portion of an annular cellular plastic element included in the sealing device according to the invention.
Figure 4:
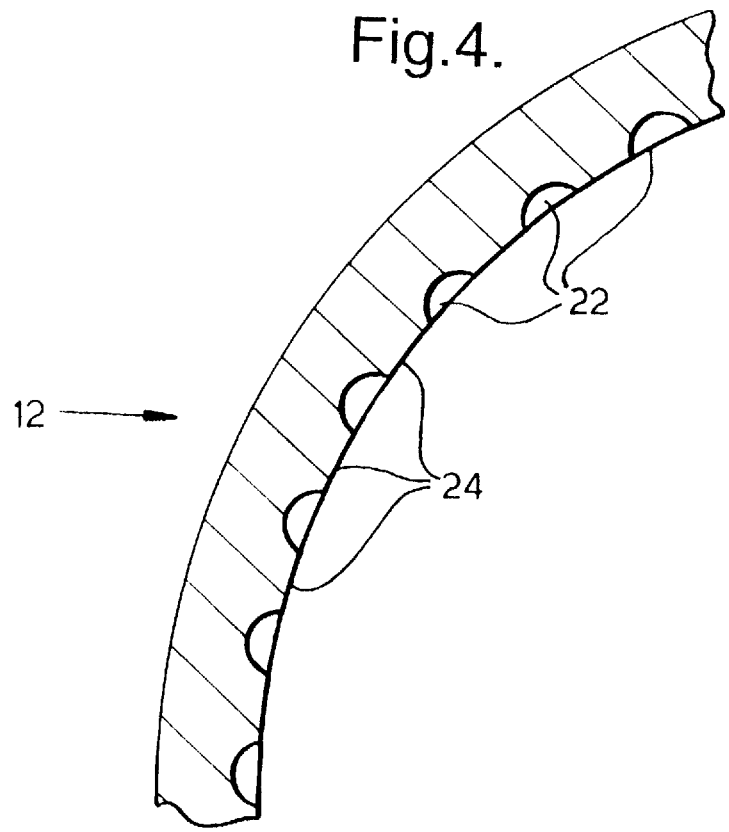
FIG. 4 is a section on line III—III of FIG. 3.

FIGS. 3 and 4 show on an enlarged scale an axial section and a cross-section, respectively, of a part of the cellular plastic element 12 included in the sealing device 8 according to FIGS. 1 and 2. FIGS. 3 and 4 illustrate especially the design of the grooves 22 and the bead-shaped elements 24 of the cellular plastic element 12. As appears form FIG. 3, the grooves have at their ends rounded portions preventing the collection of dirt, water and ice in the grooves 22 and also facilitating cleaning of the grooves prior to the pipe jointing. As shown in FIG. 4, the grooves 24 have the cross-sectional shape corresponding to sectors of a circle which means that the grooves 22 completely lack sharp corners which as mentioned above restricts the collection of dirt, water and ice and facilitates the cleaning of the grooves.

The grooves 22 facing the inner part of the socket 4 are advantageous also by the fact that the grooves can take up excess of sliding agents used at the pipe jointing.

The sliding agents positioned in the grooves facilitate movements between socket and spigot end subsequently to the pipe jointing which reduces the risk for damages to the pipes.

Figure 5:
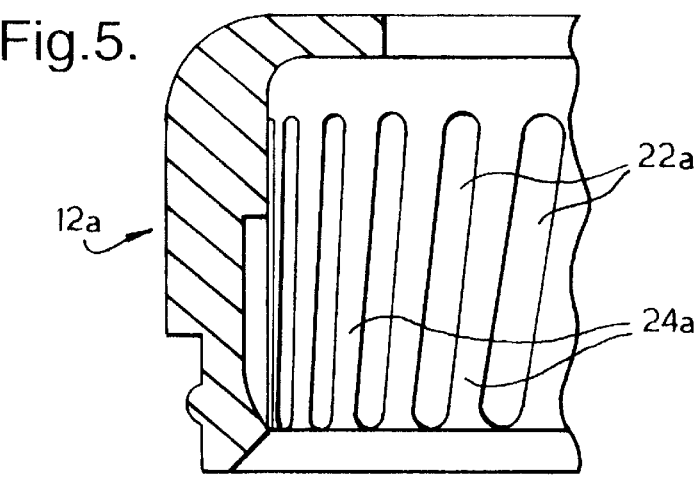
FIGS. 5–7 show axial sections corresponding to FIG. 3 of different embodiments of the cellular plastic material element included in the sealing device according to the invention.

In the embodiment of the cellular plastic element 12 included in the sealing device according to the invention and shown in FIG. 5 the cellular plastic element is formed with grooves 22a and intermediate bead-shaped projections 24a which extend obliquely to the axial direction of the cellular plastic element 12a. In the embodiment shown, the grooves and the bead-shaped projections extend at an angle of about 10° in relation to the axial direction, but the magnitude of this angle can be varied within wide limits. The oblique extension of the grooves 22a and the bead-shaped projections 24a facilitates the breaking of the bead-shaped projections 24a and the displacement of the material of the bead-shaped projections to the grooves 22a under the influence of the spigot end introduced into the socket.

Figure 6:
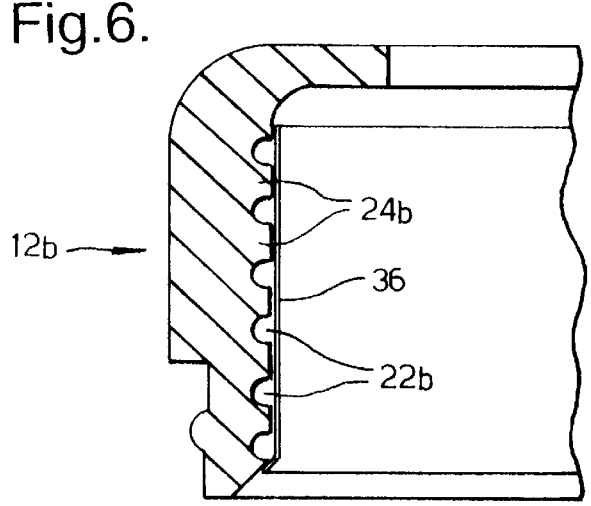

In the embodiment of the cellular plastic element 12b shown in FIG. 6 and included in the sealing device according to the invention the grooves 22b and the intermediate bead-shaped projections 24b extend peripherally around the cellular plastic element 12b. This position of the grooves 22b and the bead-shaped projections 24b provides, if the grooves are open inwards, a relatively large risk for the collection of dirt, water and ice in the grooves, simultaneously as the cleaning of the grooves will be difficult to conduct. For this reason the grooves are in this embodiment covered by means of a thin foil 36 of for example plastic material, so that the cellular plastic element 12b is provided with a flat inner surface. Thus, the foil 36 prevents entrance of dirt, water and ice to the grooves 22b without preventing or obstructing the displacement of the cellular plastic material of the bead-shaped projections 24b into the grooves 22b, when the spigot end is introduced into the socket provided with the sealing device according to the invention.

Figure 7:
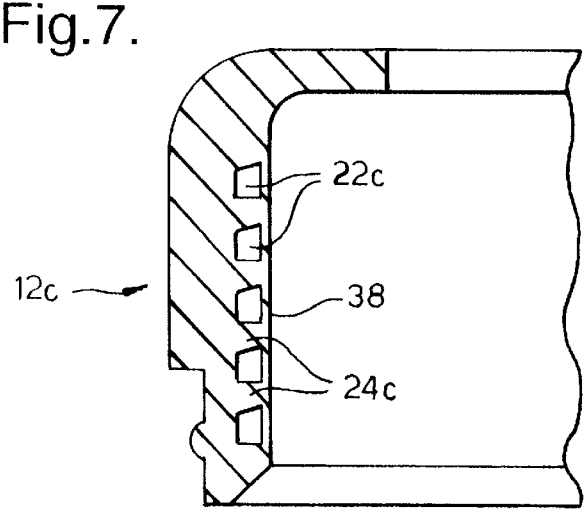

In the embodiment of the cellular plastic element 12c included in the sealing device and shown in FIG. 7b the grooves 22c are closed by means of thin walls 38 of the same material as the rest of the cellular plastic element 12c, i.e. thin walls of cellular plastic. The bead-shaped projections 24c positioned between the grooves 22c are directed obliquely upwards in such a way that the bead-shaped projections 24c are relatively easy folded into the grooves 22c under the influence of the spigot end which is introduced into the pipe socket provided with the sealing device according to the invention.

It is realized that the invention can be modified within the scope of the following claims especially with regard to the recesses or grooves in the cellular plastic element of the sealing device.

We claim:

1. A sealing device for sealing an annular space between two pipes, one of the pipes (2) consisting of a hardenable material and forming a socket (4) formed with a substantially cylindrical inner surface (6) and the other pipe forming a spigot end axially introducable into the socket and formed with a substantially cylindrical outer surface, the sealing device comprising a sealing ring (10) consisting of elastic material having a sealing portion (18) for sealing the annular space and comprising an annular element (12) connected with the sealing ring and consisting of non-elastic cellular plastic, the sealing device being adapted to be positioned on a substantially cylindrical mould part in a mould for moulding the pipe provided with the socket and for moulding the sealing device into the socket at the cylindrical inner surface thereof with the sealing ring positioned adjacent the free end of the socket and the annular element positioned axially inside the sealing ring, the annular element (12) consisting essentially of non-elastic cellular plastic formed with recesses (22) positioned at the inner surface of the annular element for allowing a radial expansion of the inner surface of the annular element under the influence of the spigot end introduced into the socket under the influence of the deformation of the sealing portion (18) of the sealing ring.

2. A sealing device as claimed in claim 1, characterized in that the recesses have the form of grooves (22) with intermediate bead-shaped projections (24) forming the inner surface of the annular element (12).

3. A sealing device as claimed in claim 2, characterized in that the grooves (22) and the bead-shaped projections (24) extend in the axial direction of the socket (4).

4. A sealing device as claimed in claim 2, characterized in that the grooves (22a) and the bead-shaped projections (24a) extend obliquely with regard to the axial direction of the socket (4).

5. A sealing device as claimed in claim 4, characterized in that the grooves (22a) and the bead-shaped projections (24a) extend at an angle of 10–45° in relation to the axial direction of the socket (4).

6. A sealing device as claimed in claim 2, characterized in that the grooves (22) have in cross-section a rounded bottom.

7. A sealing device as claimed in claim 3, characterized in that the grooves (22) have a rounded shape at their ends.

8. A sealing device as claimed in claim 2, characterized in that the grooves (22b; 22c) and the bead-shaped projections (24b; 24c) extend peripherally around the socket.

9. A sealing device as claimed in claim 1, characterized in that the annular element consisting of non-elastic cellular plastic is in connection with the sealing portion of the sealing ring formed with a chamfer, which has the shape of a conical surface (28).

10. A sealing device as claimed in claim 1, characterized in that the recesses (22b; 22c) are closed against the inner surface of the annular element (12b; 12c).

11. A sealing device as claimed in claim 10, characterized in that the recesses (22b) are closed by means of a foil-covering (36).

12. A sealing device as claimed in claim 10, characterized in that the recesses (22b) are closed by means of thin walls (38) of the same material as the annular element (12c) consisting of non-elastic cellular plastic.

13. A sealing device as claimed in claim 1, characterized in that the sealing ring (10) and the annular element (12) consisting of non-elastic cellular plastic are connected with each other by means of cooperating engagement means (20, 26).

14. A sealing device as claimed in claim 13, characterized in that the cooperating engagement means are formed on two concentric portions of the sealing ring (10) and the annular element (12) and are constituted by a peripherally extending groove (20) and an annular projection (26) cooperating therewith.

15. A sealing device as claimed in claim 3, characterized in that the grooves (22) have in cross-section a rounded bottom.

16. A sealing device as claimed in claim 4, characterized in that the grooves (22) have in cross-section a rounded bottom.

17. A sealing device as claimed in claim 5, characterized in that the grooves (22) have in cross-section a rounded bottom.

18. A sealing device as claimed in claim 4, characterized in that the grooves (22) have a rounded shape at their ends.

19. A sealing device as claimed in claim 5, characterized in that the grooves (22) have a rounded shape at their ends.

20. A sealing device as claimed in claim 6, characterized in that the grooves (22) have a rounded shape at their ends.

21. A sealing device as claimed in claim 1, wherein said recesses are arrayed circumferentially on the inner surface of the annular element.

* * * * *